US008687727B2

(12) United States Patent
Davydov et al.

(10) Patent No.: US 8,687,727 B2
(45) Date of Patent: Apr. 1, 2014

(54) COORDINATED MULTI-POINT TRANSMISSION USING INTERFERENCE FEEDBACK

(75) Inventors: Alexei Davydov, Nizhny Novgorod (RU); Alexander Maltsev, Nizhny Novgorod (RU); Gregory Morozov, Nizhny Novgorod (RU); Vadim Sergeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 324 days.

(21) Appl. No.: 13/075,023

(22) Filed: Mar. 29, 2011

(65) Prior Publication Data

US 2012/0114028 A1 May 10, 2012

Related U.S. Application Data

(60) Provisional application No. 61/410,740, filed on Nov. 5, 2010.

(51) Int. Cl.
*H04B 7/02* (2006.01)
(52) U.S. Cl.
USPC ........... 375/267; 375/260; 375/296; 375/299; 375/347; 375/349
(58) Field of Classification Search
USPC ......... 375/267, 260, 296, 299, 346, 347, 348, 375/349
See application file for complete search history.

(56) References Cited

U.S. PATENT DOCUMENTS

2010/0195594 A1* 8/2010 Seo et al. ................. 370/329
2011/0014909 A1* 1/2011 Han et al. ................. 455/423
2011/0014940 A1* 1/2011 Zhang et al. ............... 455/522

OTHER PUBLICATIONS

Kim et al., "PMI Restriction with Adaptive Feedback Mode," IEEE 802.16 Broadband Wireless Access Working Group, IEEE C802.16m-09/0023, LG Electronics, Jan. 5, 2009, pp. 1-5, Anyang, Korea.
"SCF-based Coordinated Beamforming and Performance Gain over Single-Point SU/MU Beamforming," Agenda Item 7.5.3, R1-094848, 3GPP TSG RAN1#59, Motorola, Nov. 9-13, 2009, pp. 1-11, Jeju, South Korea.
International Preliminary Report on Patentability mailed May 7, 2013 from International Application No. PCT/US2011/057435.

* cited by examiner

*Primary Examiner* — Kabir A Timory
(74) *Attorney, Agent, or Firm* — Schwabe, Williamson & Wyatt, P.C.

(57) ABSTRACT

Embodiments of methods and apparatus for wirelessly receiving, by a user equipment (UE), interference signal from a first enhanced Node B (eNB) while the UE is communicating with a second eNB; generating interference feedback information that is associated with an interference channel between the first eNB and the UE; and transmitting the interference feedback information to the first eNB via the second eNB are disclosed. Additional variants and embodiments are also disclosed.

20 Claims, 6 Drawing Sheets

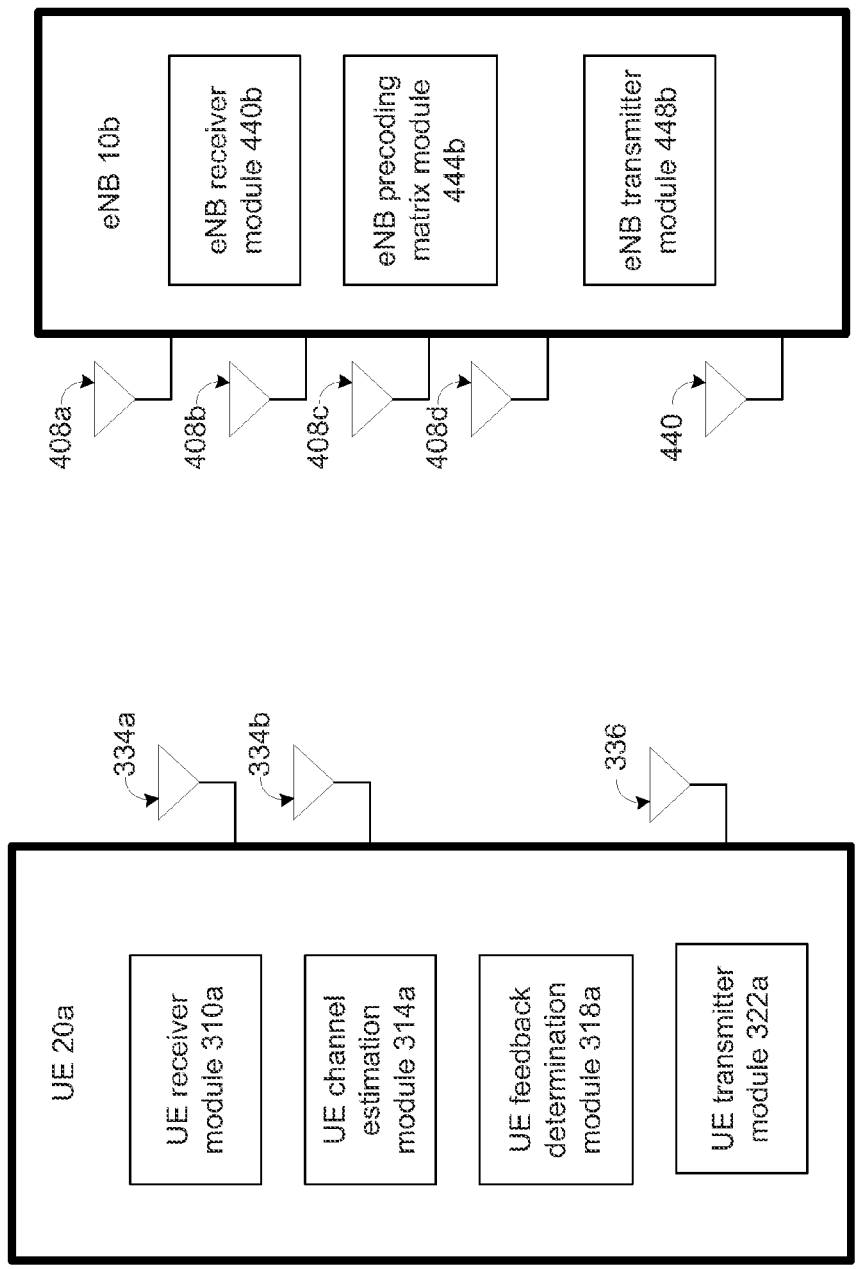

COORDINATED MULTI-POINT TRANSMISSION USING INTERFERENCE FEEDBACK

CROSS REFERENCE TO RELATED APPLICATION

The present application claims priority to U.S. Patent Application No. 61/410,740, titled "Advanced Wireless Communication Systems And Techniques," filed Nov. 5, 2010, the entire specification of which is hereby incorporated by reference in its entirety for all purposes, except for those sections, if any, that are inconsistent with this specification.

TECHNICAL FIELD

Embodiments of the present disclosure relate generally to wireless communication systems, and more particularly, to methods and apparatuses for coordinated multi-point transmission using interference feedback.

BACKGROUND

A mobile station in a closed-loop multi input and/or multi output (MIMO) system generally transmits channel feedback information (e.g., a channel state information, a channel quality indicator, etc.) to an enhanced Node B (eNB) with which the mobile station is communicating over a wireless channel. The channel feedback information is generally used to employ beamforming at the eNB, to compensate for the current channel conditions.

BRIEF DESCRIPTION OF THE DRAWINGS

Embodiments of the present disclosure will be described by way of exemplary embodiments, but not limitations, illustrated in the accompanying drawings in which like references denote similar elements, and in which:

FIG. 3 schematically illustrates an exemplary user equipment included in the communication system of FIG. 1 in more detail, in accordance with various embodiments of the present disclosure.

FIG. 4 schematically illustrates an exemplary eNB included in the communication system of FIG. 1 in more detail, in accordance with various embodiments of the present disclosure.

DETAILED DESCRIPTION

Figure 1:
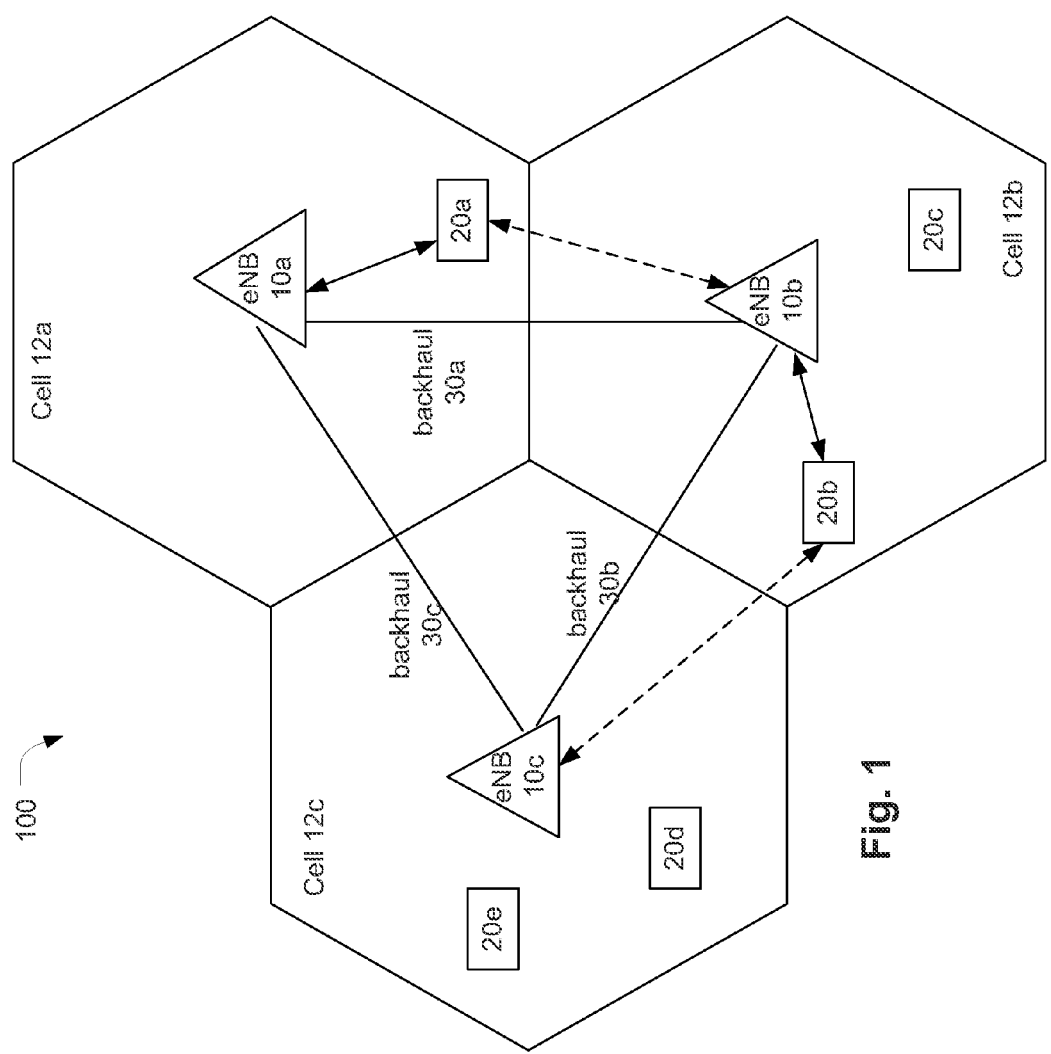
FIG. 1 schematically illustrates a communication system, in accordance with various embodiments of the present disclosure.

Illustrative embodiments of the present disclosure include, but are not limited to, methods and apparatuses for coordinated multi-point transmission in a wireless communication network using interference feedback.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Embodiments of the present disclosure may be used in wireless access networks that employ orthogonal frequency division multiple access (OFDMA) communications as used by multicarrier transmission schemes presented in, e.g., the Institute of Electrical and Electronics Engineers (IEEE) 802.16-2009, approved May 13, 2009, along with any amendments, updates, and/or revisions (e.g., 802.16m, which is presently at predraft stage), 3rd Generation Partnership Project (3GPP) long-term evolution (LTE) project, advanced LTE project, ultra mobile broadband (UMB) project (also referred to as "3GPP2"), Worldwide Interoperability for Microwave Access (WiMAX), etc. In other embodiments, communications may be compatible with additional/alternative communication standards and/or specifications.

FIG. 1 schematically illustrates a communication system 100, in accordance with various embodiments of the present disclosure. In various embodiments, the communication system 100 includes a plurality of eNBs, e.g., eNB 10a, eNB 10b and eNB 10c. Although only three eNBs are illustrated in FIG. 1, the communication system may include any other number of eNBs. FIG. 1 also illustrates a cell, e.g., an approximate geographical area, covered by a corresponding eNB. For example, eNB 10a covers cell 12a, eNB 10b covers cell 12b, and eNB 10c covers cell 12c. Although individual cells are illustrated to be approximately hexagonal in shape and similar in size, in various other embodiments, the cells can be of any shape and/or size, and/or may overlap.

In various embodiments, an eNB may be communicatively coupled to another eNB through a backhaul channel. For example, the eNB 10a and the eNB 10b may be communicatively coupled through a backhaul channel 30a, the eNB 10b and the eNB 10c may be communicatively coupled through a backhaul channel 30b, and the eNB 10c and the eNB 10a may be communicatively coupled through a backhaul channel 30c. In an embodiment, a backhaul channel (or a part of the backhaul channel) may be established using a wired link and/or a wireless link.

In various embodiments, the communication system 100 may include a plurality of user equipments (UEs), e.g., UE 20a, ..., 20e, disposed throughout the cells 12a, ..., 12c. The UEs (e.g., UE 20a) may be, for example, a mobile station, a cellular or mobile phone, or any other appropriate consumer electronic device capable of wirelessly communicating with an eNB over a wireless communication channel using any appropriate wireless transmission protocol. The eNBs (e.g., eNB 10a) may be, for example, any appropriate type of evolved Node B and/or any other appropriate type of base station configured to wirelessly communicate with one or more UEs over a wireless communication channel using any appropriate wireless transmission protocol.

Each UE may communicate with a proximally disposed eNB over a wireless communication channel. For example, the UE 20a is disposed within the cell 12a, and accordingly, communicates with the eNB 10a over a wireless communication channel (illustrated by solid line between the UE 20a and the eNB 10a). In various embodiments, an UE may also receive interference from one or more neighboring eNBs. For example, as illustrated in FIG. 1, the UE 20a receives interference signal from the eNB 10b (illustrated by broken line between the UE 20a and the eNB 10b), while the UE 20a communicates with the eNB 10a over the wireless communication channel. Similarly, the UE 20b may be disposed within the cell 12b, and accordingly, may communicate with the eNB 10b over another wireless communication channel (illustrated by solid line between the UE 20b and the eNB 10b). Furthermore, the UE 20b may receive interference signal from the eNB 10c (illustrated by broken line between the UE 20b and the eNB 10c), while the UE 20b communicates with the eNB 10b over the another wireless communication channel.

FIG. 1 only illustrates the UE 20a and the UE 20b communicating with the corresponding eNBs, and receiving interference signals from other eNBs. Although not illustrated in FIG. 1, other UEs (e.g., UE 20c, ..., 20e) may also communicate over a corresponding wireless communication channel with a corresponding eNB, and possibly receive interference signals from one or more other eNBs.

In various embodiments, one or more of the eNBs and/or the UEs may be MIMO devices. In various embodiments, the communication system 100 may be a closed-loop system that employs beamforming to increase a signal to noise ratio (SNR) of signals transmitted by individual eNBs to the corresponding UEs. In various embodiments, an eNB (e.g., eNB 10a) may transmit one or more data streams to a UE (e.g., UE 20a), which may be appropriately weighted onto one or more antennas prior to transmission by the eNB 10a. The term beamforming or precoding is used herein to describe the application of beamforming or precoding coefficients or weights to frequency-domain signals in the data stream(s), prior to transmission of the data stream(s) by an eNB. In various embodiments, the beamforming or precoding coefficients or weights may be determined from a precoding matrix, as will be discussed in more detail herein later.

Figure 2:
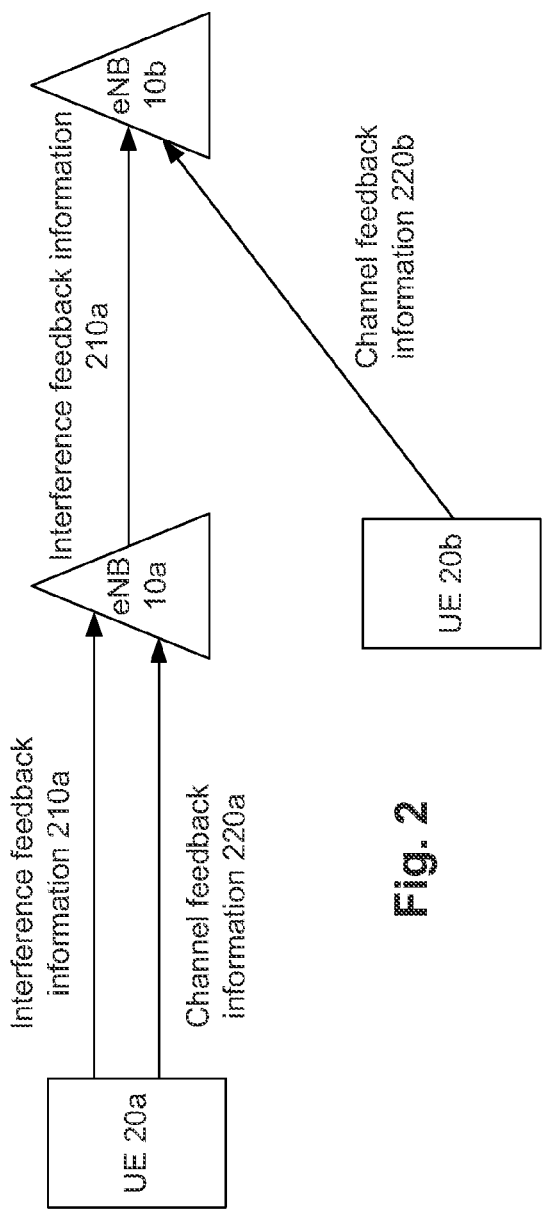
FIG. 2 schematically illustrates an exemplary eNB receiving feedback information from a plurality of user equipments, in accordance with various embodiments of the present disclosure.

FIG. 2 schematically illustrates the eNB 10b receiving feedback information from a plurality of UEs, in accordance with various embodiments of the present disclosure. As previously discussed, the UE 20a may communicate with the eNB 10a over a wireless communication channel and may also receive interference from the interfering eNB 10b. In various embodiments, the UE 20a may generate interference feedback information 210a based on receiving interference signals from the eNB 10b, as will be discussed in more detail herein later. In various embodiments, the UE 20a may also generate channel feedback information 220a based on receiving signals from the eNB 10a, as will be discussed in more detail herein later. The UE 20a may transmit the interference feedback information 210a and the channel feedback information 220a to the eNB 10a over the wireless communication channel. The eNB 10a may re-transmit the interference feedback information 210a to the eNB 10b over the backhaul channel 30a. Although FIG. 2 illustrates the eNB 10a re-transmitting the interference feedback information 210a (e.g., which the eNB 10a receives from the UE 20a) to the eNB 10b, in various embodiments, the eNB 10a may process the interference feedback information 210a before re-transmitting the interference feedback information 210a to the eNB 10b. Accordingly, although illustrated using a single label in FIG. 2, in various embodiments, (i) the interference feedback information 210a received by the eNB 10a from the UE 20a and (ii) the interference feedback information 210a re-transmitted by the eNB 10a to the eNB 10b may be different (e.g., based on any processing performed on the interference feedback information 210a by the eNB 10a), as will be readily understood by those skilled in the art based on the teachings of this disclosure. In various embodiments, the UE 20b may generate channel feedback information 220b based on receiving signals from the eNB 10b, and may transmit the channel feedback information 220b to the eNB 10b.

Although not illustrated in FIG. 2, the UE 20b may, for example, transmit interference feedback information to another eNB (e.g., eNB 10c) via the eNB 10b. Similarly, although not illustrated in FIG. 2, the eNB 10b may receive interference feedback information from one or more other UEs (e.g., from UEs that receive interference signals from the eNB 10b) and also receive channel feedback information from one or more other UEs (e.g., UE 20c, which is in communication with the eNB 10b).

In various embodiments, the eNB 10b may receive the channel feedback information 220b and the interference feedback information 210a, and determine a precoding matrix (e.g., which may be used to weight data streams onto antennas prior to transmission by the eNB 10b) that reduces interference between the eNB 10b and UE 20a and increases signal strength of the signal received by the UE 20b, as will be discussed in more detail herein later.

FIG. 3 schematically illustrates the UE 20a included in the communication system 100 of FIG. 1 in more detail, in accordance with various embodiments of the present disclosure. In various embodiments, one or more other UEs included in the communication system 100 of FIG. 1 may have a similar configuration as the UE 20a of FIG. 3.

In various embodiments, the UE 20a may include one or more receive antennas, e.g., receive antennas 334a and 334b, configured to receive signals transmitted from one or more eNBs (e.g., from eNB 10a). In FIG. 3, two receive antennas are illustrated, although in various other embodiments, any other suitable number of receive antennas may be included in the UE 20a. In various embodiments, the UE 20a may include at least as many receive antennas as a number of data stream (s) being transmitted by the eNB 10a, although the scope of the present disclosure may not be limited in this respect. The UE 10a may also include one or more transmit antennas (e.g., transmit antenna 336) to transmit, among other information, interference feedback information 210a and channel feedback information 220a. In some embodiments, one or more antennas of the UE 20a may be alternatively used as receive or transmit antennas.

In various embodiments, the UE 20a may include a UE receiver module 310a configured to receive signals that are received by the receive antennas 334 and/or 334b. The UE receiver module 310a may pre-process the received signals before one or more other components of the UE 20a processes the signals.

In various embodiments, the UE 20a may also include a UE channel estimation module 314a. The UE channel estimation module 314a may be configured to estimate a wireless communication channel between the UE 20a and the eNB 10a, based on the receive antennas 334a and/or 334b receiving wireless signals from the eNB 10a over the wireless communication channel between the UE 20a and the eNB 10a. For example, the UE channel estimation module 314a may estimate a channel matrix H_10a_20a that represents the wireless communication channel between the UE 20a and the eNB 10a.

The UE channel estimation module 314a may also be configured to estimate an interference channel between the UE 20a and the eNB 10b, based on the receive antennas 334a and/or 334b receiving interference signals from the eNB 10b over the wireless communication channel between the UE 20a and the eNB 10b. For example, the UE channel estimation module 314a may estimate an interference channel matrix G_10b_20a that represents the interference channel between the UE 20a and the eNB 10b. In various embodiments, if the UE 20a receives interference from more than one eNB (i.e., receives interference from an eNB other than the eNB 10b), the UE channel estimation module 314a may estimate more than one interference channel matrix.

In various embodiments, the UE 20a may also include a UE feedback determination module 318a, which is configured to receive the channel matrix H_10a_20a and the interference channel matrix G_10b_20a (and/or receive some other representation, e.g., indices, associated with these matrices) from the UE channel estimation module 314a. In various embodiments, the UE feedback determination module 318a may be configured to generate the interference feedback information 210a and the channel feedback information 220a of FIG. 2.

As an example, the UE feedback determination module 318a may be configured to determine an interference feedback matrix v_10_20a that is associated with the interference channel between the eNB 10b and the UE 20a, based at least in part on the interference channel matrix G_10b_20a. In various embodiments, the interference feedback matrix v_10b_20a may comprise one or more eigenvectors associated with the interference channel (e.g., one or more eigenvectors of the interference channel matrix G_10b_20a) between the eNB 10b and the UE 20a. In various embodiments, the UE feedback determination module 318a may also determine an interference feedback matrix index that is associated with the interference feedback matrix v_10_20a. In an example, the UE feedback determination module 318a may determine the interference feedback matrix index from the interference feedback matrix v_10_20a (e.g., using a predetermined codebook stored in the UE 20a, although any other appropriate method may be used to determine the interference feedback matrix index from the interference feedback matrix v_10_20a). In various embodiments, the interference feedback matrix index may be an interference precoding matrix index associated with the interference channel between the eNB 10b and the UE 20a. In various embodiments, the interference feedback information 210a may comprise the interference feedback matrix and/or the interference feedback matrix index generated by the UE feedback determination module 318a.

In various embodiments, the UE feedback determination module 318a may also determine a channel quality indicator (CQI), and the interference feedback information 210a and/or the channel feedback information 220a may also comprise the determined CQI. Determination of the CQI, by the UE feedback determination module 318a, will be discussed in more detail herein later.

In various embodiments, the interference feedback information 210a may comprise any other appropriate feedback information. For example, the UE feedback determination module 318a may determine (e.g., based at least in part on the interference channel matrix G_10b_20a) a preferred interference rank indicator, and the interference feedback information 210a may also comprise the preferred interference rank indicator. In various embodiments, the preferred interference rank indicator may include a recommended number of spatial layers (or data streams) that may be transmitted by the interfering eNB 10b, in order to improve a performance of the UE 20a (e.g., reduce interference signal experienced by the UE 20a).

The UE feedback determination module 318a may also determine various parameters that are to be included in the channel feedback information 220a. For example, based on the channel matrix H_10a_20a, the UE feedback determination module 318a may determine a channel feedback matrix v_10a_20a associated with the wireless communication channel between the UE 20a and the eNB 10a, and also determine a corresponding channel feedback matrix index. In various embodiments, the channel feedback matrix may be a matrix of eigenvectors of the channel between the eNB 10a and the UE 20a (e.g., one or more eigenvectors of the channel matrix H_10a_20a). In various embodiments, the channel feedback matrix index may be a precoding matrix index associated with the channel between the eNB 10a and the UE 20a. The channel feedback information 220a may comprise the channel feedback matrix v_10a_20a, the associated channel feedback matrix index, and/or any other information associated with the wireless communication channel between the UE 20a and the eNB 10a. For example, the channel feedback information 220a may also comprise a rank indicator, a modulation and coding scheme (MCS), and/or any other appropriate information.

In various embodiments, the UE 20a may also include a UE transmitter module 322a, which may transmit, via the transmit antenna 336, the channel feedback information 220a and the interference feedback information 210a to the eNB 10a over the wireless communication channel between the UE 20a and the eNB 10a.

FIG. 4 schematically illustrates the eNB 10b included in the communication system 100 of FIG. 1 in more detail, in accordance with various embodiments of the present disclosure. In various embodiments, one or more other eNBs included in the communication system 100 of FIG. 1 may have a similar configuration as the eNB 10b of FIG. 4.

In various embodiments, the eNB 10b may comprise a plurality of transmit antennas 408a, 408b, 408c and 408d, to transmit a weighted data stream (e.g., weighted by a corresponding precoding matrix). In FIG. 4, four transmit antennas are illustrated, although in various other embodiments, any other suitable number of transmit antennas may be included in the eNB 10b. In various embodiments, the eNB 10b may include at least as many transmit antennas as the number of data stream(s) being transmitted by eNB 10b, although the scope of the present disclosure may not be limited in this respect.

The eNB 10b may also include one or more receive antennas (e.g., receive antenna 440) that, in various embodiments, may receive, among other information, interference feedback information 210a from the UE 20a via the eNB 10a. In some embodiments, one or more antennas of the eNB 10b may be alternatively used as receive or transmit antennas.

In various embodiments, the backhaul channel 30a (or a part of the backhaul channel 30a) may be a wired link (e.g., a copper wire link, an optical fiber link, or any appropriate type of wired link), and the eNB 10b may receive the interference feedback information 210a over a wired link (e.g., instead of receiving using the receive antenna 440). In various other embodiments, the backhaul channel 30a (or a part of the backhaul channel 30a) may be a wireless link in a frequency band that, for example, is different from a frequency band used for communication between a UE (e.g., the UE 20a) and an eNB (e.g., the eNB 10a). In some of these embodiments, the frequency band used for the backhaul channel 30a may be arranged in a millimeter-wave band using frequencies substantially close to 60 GHz, although the scope of the disclosure is not limited in this respect. In these embodiments, the backhaul link 30a may be referred to as an out-of-band wireless backhaul link. In various other embodiments, any other suitable frequency bands may also be used for the backhaul channel 30a. For example, in various other embodiments, the backhaul channel 30a may be a wireless link in a frequency band that is substantially similar to the frequency band used for communication between a UE (e.g., the UE 20a) and an eNB (e.g., the eNB 10a). In these embodiments, the backhaul link 30a may be referred to as an in-band wireless backhaul link.

The eNB 10b (e.g., the receive antenna 440) may also receive channel feedback information 220b from the UE 20b, wherein the channel feedback information 220b may include feedback information about the wireless communication channel between the UE 20b and the eNB 10b.

The eNB 10b may also include an eNB receiver module 440b configured to receive signals that are received by the receive antennas 408a, . . . , 408d. In various embodiments and although not illustrated in FIG. 4, the receive antennas 408a, . . . , 408d may be a part of the eNB receiver module 440b. The eNB receiver module 440b may pre-process the received signals before one or more other components of the eNB 10b processes the signals. In various embodiments, the eNB receiver module 440b may receive the interference feedback information 210a and the channel feedback information 220b.

The eNB 10b may also include an eNB precoding matrix module 444b. In various embodiments, the eNB precoding matrix module 444b may receive interference feedback information from one or more UEs that receive interference signals from the eNB 10b. For example, as illustrated in FIG. 2, the eNB precoding matrix module 444b may receive the interference feedback information 210a from the UE 20a. Furthermore, the eNB precoding matrix module 444b may receive channel feedback information from one or more UEs that communicate with the eNB 10b over one or more corresponding wireless communication channels. For example, the eNB precoding matrix module 444b may receive the channel feedback information 220b from the UE 20b.

Based on the received interference feedback information 210a and the channel feedback information 220b, the eNB precoding matrix module 444b may determine a precoding matrix PM_b. As an example, the received interference feedback information 210a and the channel feedback information 220b may include the interference feedback matrix v_10_20a and the channel feedback matrix v_10_20b, respectively (or include indices associated with the respective matrix). In various embodiments, the eNB precoding matrix module 444b may determine the precoding matrix PM_b as:

$$PM\_b = V((V^H)V)^{-1} \qquad \text{,Equation (1)}$$

where the matrix $V^H$ represents the Hermitian matrix of the matrix V (i.e., the matrix $V^H$ is a complex conjugate of the matrix V), and the matrix V=[(v_10_20b) (v_10_20a)]. That is, the matrix V may be a concatenation of the interference feedback matrix v_10_20b and the channel feedback matrix v_10_20a.

In various embodiments, the precoding matrix PM_b may be portioned as $$PM\_b = [w1\ w2], \qquad \text{Equation (2)}$$

where w1 includes precoding weights corresponding to transmission of signals from the eNB 10b to the UE 20b, and whereas w2 includes precoding weights corresponding to transmission of signals from the eNB 10b to the UE 20a. That is, the precoding matrix PM_b may be a concatenation of the matrices w1 and w2.

In various embodiments, a number of columns in the matrix w1 may be equal to a number of data streams transmitted by the eNB 10b. In various embodiments, the number of data streams transmitted by the eNB 10b may be pre-configured, or may be adaptively determined based on, for example, the preferred interference rank indicator transmitted by the UE 20a to the eNB 10b as a part of the interference feedback information 210a.

As the eNB 10b intends to transmit signals to UE 20b (but not to UE 20a), the eNB precoding matrix module 444b may determine a truncated precoding matrix PM_b_t such that $$PM\_b\_t = [w1]. \qquad \text{Equation (3)}$$

That is, in the truncated precoding matrix PM_b_t, the component of the precoding matrix PM_b (i.e., w2) associated with the interference channel between the eNB 10b and the UE 20a is truncated.

In various embodiments, the eNB 10b also includes an eNB transmitter module 448b configured to transmit (e.g., via the transmit antenna 440) one or more data streams (e.g., to the UE 20b), which may be appropriately weighted (e.g., in the eNB precoding matrix module 444b) by the truncated precoding matrix PM_b_t prior to transmission by the eNB 10b.

As previously discussed, the matrix w1 may be associated with the direction of the channel between the eNB 10b and UE 20b, and the matrix w2 may be associated with the direction of the interference channel between the eNB 10b and UE 20a. Furthermore, the vectors in the matrices w1 and w2 may be unitary and orthogonal to each other (as the vectors in the matrices w1 and w2 are a part of the precoding matrix PM_b). Accordingly, signals transmitted by the eNB 10b to the UE 20b, subsequent to being weighted by the truncated precoding matrix PM_b_t, may create relatively reduced interference at the UE 20a.

Referring again to FIG. 3, as previously discussed, the UE feedback determination module 318a may also determine a CQI. While determining the CQI, the UE 20a may be aware (e.g., based on transmitting the interference feedback information 210a) that the eNB 10b is determining the truncated precoding matrix PM_b_t based on the interference feedback matrix v_10_20a. In various embodiments, the UE 20a may use this information to determine the CQI. For example, the signal model used for determining the CQI at the UE 20a may be:

$$r=[(H\_10a\_20a)(v\_10a\_20a)x]+[(G\_10b\_20a)(v\_10\_20a^\perp)y]+n, \quad \text{Equation (4)}$$

where H_10a_20a is the channel matrix that represents the wireless communication channel between the UE 20a and the eNB 10a, G_10b_20a is the interference channel matrix that represents the interference channel between the UE 20a and the eNB 10b, x is the signal transmitted by the eNB 10a (e.g., before applying any precoding weights), y is the signal transmitted by the eNB 10b (e.g., before applying any precoding weights), n is additive noise plus interference from other eNBs (e.g., eNBs which are not involved in cooperative transmission of signals using the interference feedback information), and r is the signal received at the UE 20a. Furthermore, v_10_20a$^\perp$ may be a vector, or a set of unitary vectors orthogonal to v_10b_20a.

In various embodiments, based on the above discussed signal model, the UE 20a may estimate a signal to noise ratio (SINR) of the signals for a k$^{th}$ data stream as follows:

$$\text{SINR\_20a\_k} = \frac{1}{[H_e^H(G_e G_e^H + R_{nn})^{-1} H_e + I]_{k,k}^{-1}} - 1, \quad \text{Equation (5)}$$

where $R_{nn}=E(n^H n)$ may be a covariance matrix for additive noise plus interference n, matrix $H_e=[(H\_10a\_20a)(v\_10a200]$, matrix $G_e=[(G\_10b\_20a)(v\_10b\_20a^\perp)]$, matrix $H_e^H$ may be a Hermitian matrix of the matrix $H_e$, and matrix $G_e^H$ may be a Hermitian matrix of the matrix $G_e$. As previously discussed, v_10_20a$^\perp$ may be a vector, or a set of unitary vectors orthogonal to v_10b_20a. In various embodiments, if multiple alternatives exists for the vector v_10_20a$^\perp$ (e.g., if multiple set of unitary vectors are orthogonal to v_10b_20a), the UE 20a may select one of the alternatives for v_10_20a$^\perp$ that increases (e.g., nearly maximizes) the SINR_20a_k.

In various embodiments, it may be assumed that the interference from the eNB 10b to the UE 20a is substantially cancelled as a result of forming the precoding matrix PM_b (and the associated truncated precoding matrix PM_b_t) using the interference feedback information 210a. In some of these embodiments, the UE feedback determination module 318a may further simplify the determination of the SINR_20a_k of Equation 5 using a simplified signal model (e.g., instead of the signal model of Equation 4). For example, the signal model used for determining the CQI at the UE 20a may be:

$$r=[(H\_10a\_20a)(v\_10a\_20a)x]+n. \quad \text{Equation (4a)}$$

That is, in the simplified signal model of Equation 4a, the term $[(G\_10b\_20a)(v\_10\_20a^\perp)y]$ is ignored (as the interference from the eNB 10b to the UE 20a is substantially cancelled). In various embodiments, the corresponding SINR_20a_k may be determined as:

$$\text{SINR\_20a\_k} = \frac{1}{[H_e^H(R_{nn})^{-1} H_e + I]_{k,k}^{-1}} - 1. \quad \text{Equation (5a)}$$

That is, in Equation 5a, the term associated with the Ge matrix is ignored (as the interference from the eNB 10b to the UE 20a is substantially cancelled).

In various embodiments, the UE feedback determination module 318a may determine the SINR_20a_k (e.g., using Equation (5) and/or Equation (5a)), and also determine a CQI from the determined SINR_20a_k. In various embodiments, the UE transmitter module 322a may transmit the determined CQI to the eNB 10a as a part of the interference feedback information 210a and/or the channel feedback information 220a.

In various embodiments, the eNB 10b may receive the CQI from the UE 20a as a part of the interference feedback information 210a, and use the CQI to determine the precoding matrix PM_b. For example, the CQI may be used to fine tune the precoding matrix PM_b generated using Equation 1. In various embodiments, characterized in that a single spatial stream is transmitted from the eNB 10a to the UE 20a, the precoding matrix PM_b may be determined (e.g., instead of, or in addition to, determining using Equation (1)) as:

$$\text{PM\_b} = V\left((V^H)V + \begin{bmatrix} \rho_1^{-1} & 0 \\ 0 & \rho_2^{-1} \end{bmatrix}\right)^{-1}, \quad \text{Equation (6)}$$

where $V^H$ and V matrices have been previously discussed with respect to Equation 1, $\rho_1$ is equal to the SINR_20a_k of Equation 5, and $$\rho_2 = \frac{\text{SINR\_20a\_k}}{\text{SINR\_20a\_k'}} - 1,$$

for the case of k=1. The SINR_20a_k' corresponds to a SINR of the k$^{th}$ data stream, where k=1, at UE 20a that is determined without taking into account the interference feedback information 210a that is fed back from the UE 20a to the eNB 10b (i.e., without taking into account the v_10_20a$^\perp$). For example, the SINR_20a_k' may be determined from Equation 5, after replacing the matrix $H_e$ with the matrix H_10a_20a, and after replacing the matrix $G_e$ with the matrix G_10b_20a. In various embodiments, the UE 20a may transmit the SINR_20a_k' (and/or an associated CQI) to the eNB 10a and eNB 10b, e.g., to facilitate determination of the Equation 6. In various embodiments, Equation (6) may be used to adjust the precoding matrix PM_b to account for a relative power difference in signals received by the UE 20a from the eNB 10a and 10b.

In various embodiments, the eNB 10b may receive a CQI from the UE 20b as a part of the channel feedback information 220b. The eNB 10b may determine one or more of a modulation and coding scheme (MCS), a transmission rank, and the precoding matrix PM_b, associated with signal transmission by the eNB 10b, based at least in part on the CQI received from the UE 20b.

Figure 5:
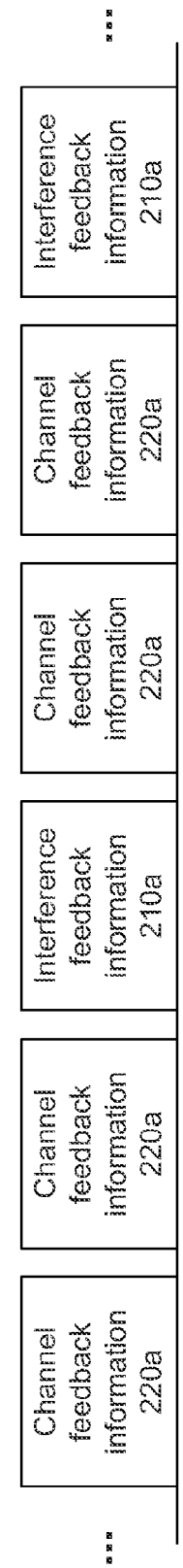
FIG. 5 schematically illustrates transmission of channel feedback information and interference feedback information from a user equipment to an eNB, in accordance with various embodiments of the present disclosure.

FIG. 5 schematically illustrates transmission of the channel feedback information 220a and the interference feedback information 210a from the UE 20a to the eNB 10a, in accordance with various embodiments of the present disclosure. As illustrated in FIG. 5, in various embodiments, the interference feedback information 210a may be interleaved in between the channel feedback information 220a. Thus, the channel feedback information 220a and the interference feedback information 210a may be time multiplexed while being transmitted from the UE 20a to the eNB 10a. In various embodiments, the UE 20a may transmit the channel feedback information 220a more frequently compared to transmitting the interference feedback information 210a to the eNB 10a, as illustrated in FIG. 5, although the scope of the present disclosure may not be limited in this respect.

Figure 6:
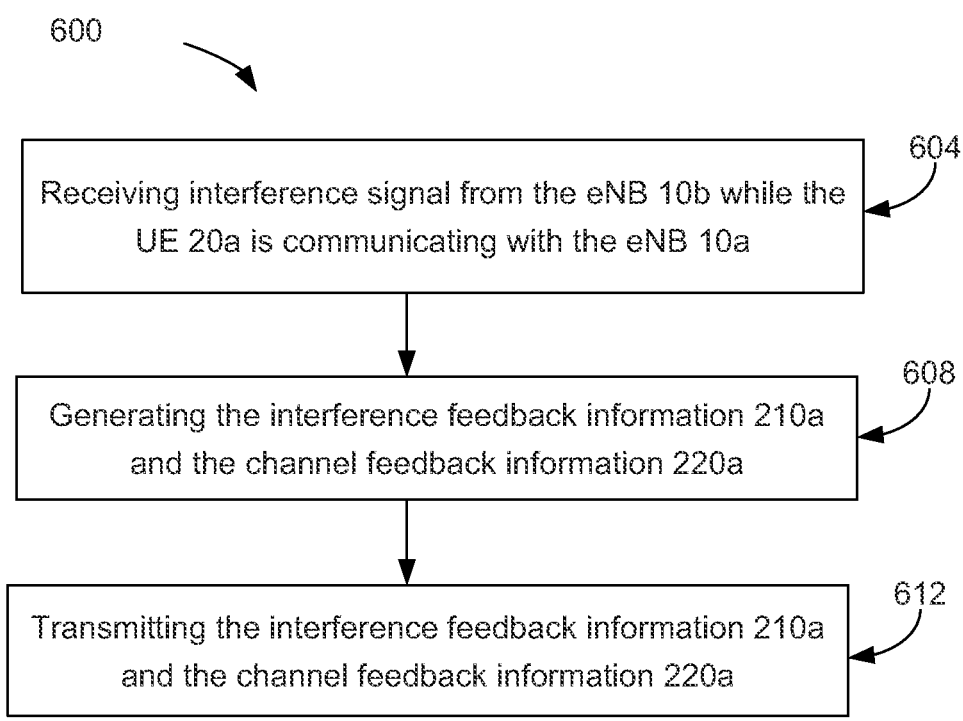
FIG. 6 illustrates an exemplary method for operating the user equipment of FIGS. 1 and 3, in accordance with various embodiments of the present disclosure.

FIG. 6 illustrates an exemplary method 600 for operating the UE 20a of FIGS. 1 and 3, in accordance with various embodiments of the present disclosure. Referring to FIGS. 1-3 and 6, the method 600 includes, at 604, wirelessly receiving, by the UE 20a, interference signal from the eNB 10b while the UE 20a is communicating with the eNB 10a over a wireless communication channel. At 608, the UE 20a generates the interference feedback information 210a, associated with an interference channel between the eNB 10b and the UE 20a, based at least in part on receiving the interference signal from the eNB 10b. The UE 20a also generates the channel feedback information 220a, associated with the wireless communication channel between the eNB 10a and the UE 20a, based at least in part on communicating with the eNB 10a. At 612, the UE 20a transmits the interference feedback information 210s to the eNB 10b via the eNB 10a, and the channel feedback information 220a to the eNB 10a. In various embodiments, the UE 20a transmits the interference feedback information 210a to the eNB 10b to facilitate a determination of a precoding matrix, by the eNB 10b, that reduces the interference signal.

Figure 7:
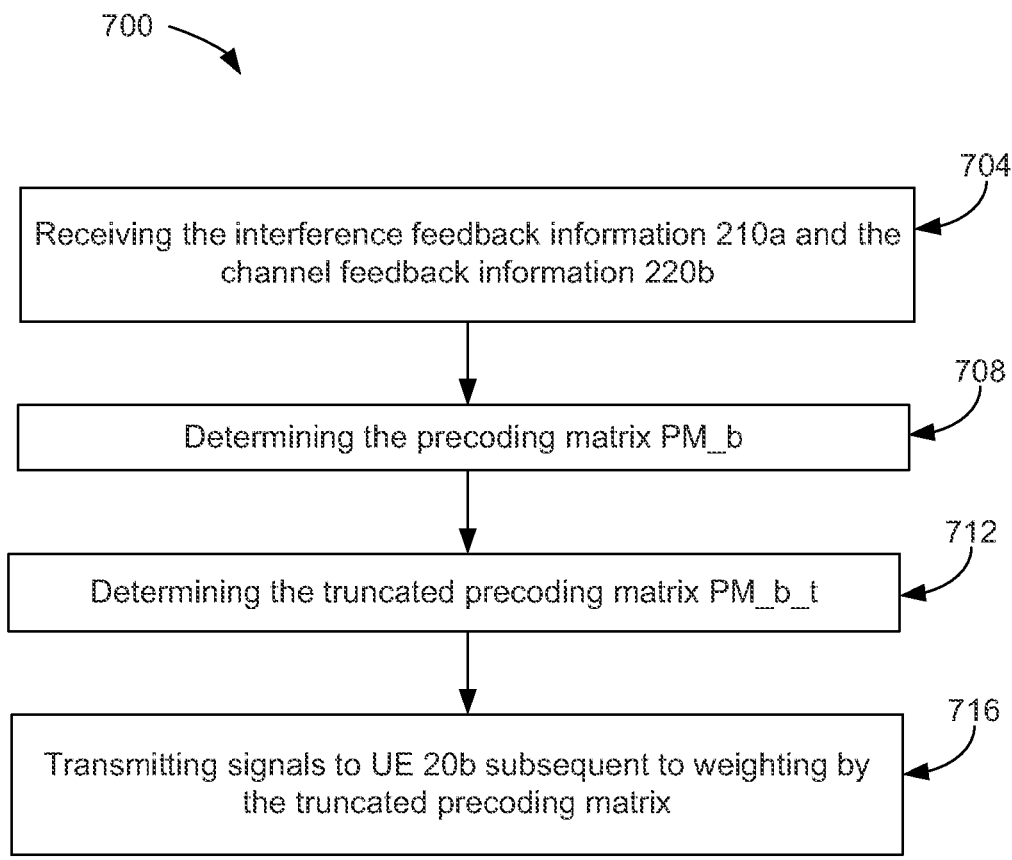
FIG. 7 illustrates an exemplary method for operating the eNB of FIGS. 1 and 4, in accordance with various embodiments of the present disclosure.

FIG. 7 illustrates an exemplary method 700 for operating the eNB 10b of FIGS. 1 and 4, in accordance with various embodiments of the present disclosure. Referring to FIGS. 1-2, 4 and 6, the method 700 includes, at 704, receiving, by the eNB 10b, the interference feedback information 210a from the UE 20a through the eNB 10a. Furthermore, at 704, the eNB 10b also receives, from the UE 20b, the channel feedback information 220b. At 708, the eNB 10b determines (e.g., using Equations 1 and/or 6) the precoding matrix PM_b based at least in part on the interference feedback information 210a and the channel feedback information 220b. At 712, the eNB 10b determines the truncated precoding matrix PM_b_t using, e.g., Equations 2 and 3. At 716, the eNB 10b transmits signals to UE 20b subsequent to weighting the signals by the truncated precoding matrix PM_b_t.

Figure 8:
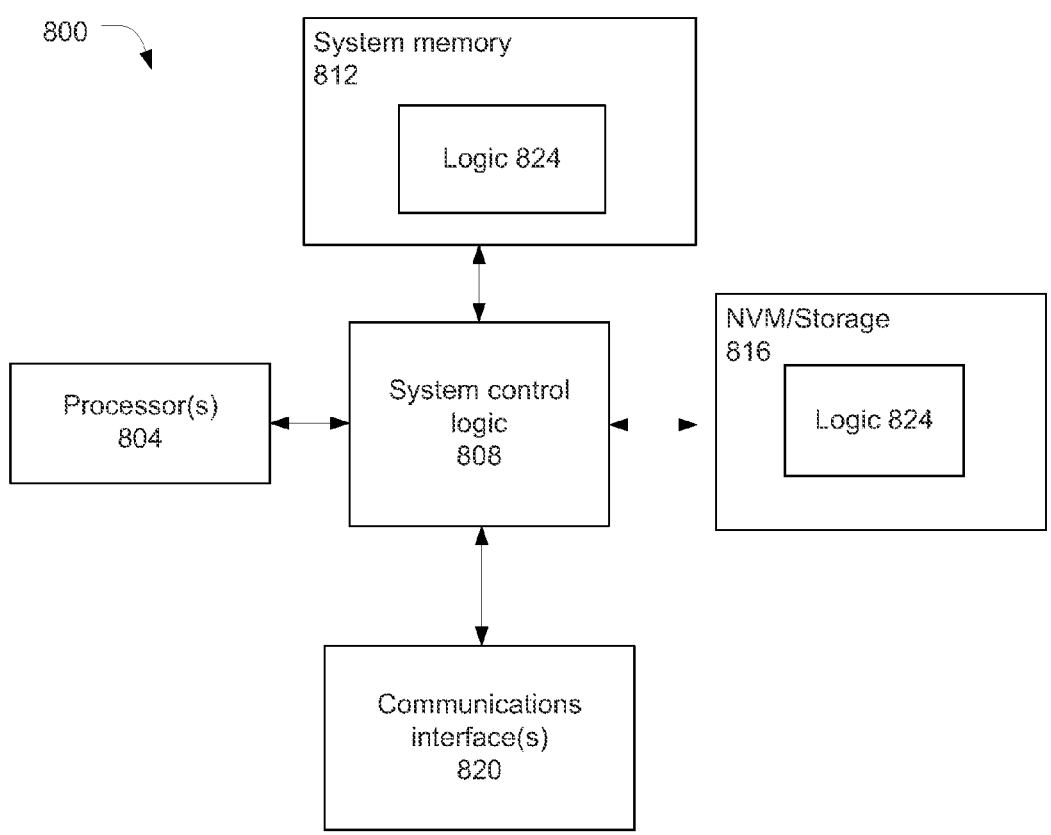
FIG. 8 illustrates an example system capable of implementing a communication device, in accordance with various embodiments of the present disclosure.

The communication devices (e.g., the eNBs 10a, 10b, etc. and/or the user equipments 20a, 20b, etc.) described herein may be implemented into a system using any suitable hardware and/or software to configure as desired. FIG. 8 illustrates, for one embodiment, an example system 800 comprising one or more processor(s) 804, system control logic 808 coupled to at least one of the processor(s) 804, system memory 812 coupled to system control logic 808, non-volatile memory (NVM)/storage 816 (e.g., which may be a non-transitory storage medium) coupled to system control logic 808, and one or more communications interface(s) 820 coupled to system control logic 808.

System control logic 808 for one embodiment may include any suitable interface controllers to provide for any suitable interface to at least one of the processor(s) 804 and/or to any suitable device or component in communication with system control logic 808.

System control logic 808 for one embodiment may include one or more memory controller(s) to provide an interface to system memory 812 (e.g., which may be a non-transitory storage medium). System memory 812 may be used to load and store data and/or instructions, for example, for system 800. System memory 812 for one embodiment may include any suitable volatile memory, such as suitable dynamic random access memory (DRAM), for example.

System control logic 808 for one embodiment may include one or more input/output (I/O) controller(s) to provide an interface to NVM/storage 816 and communications interface(s) 820.

NVM/storage 816 may be used to store data and/or instructions, for example. NVM/storage 816 may include any suitable non-volatile memory, such as flash memory, for example, and/or may include any suitable non-volatile storage device(s), such as one or more hard disk drive(s) (HDD(s)), one or more compact disc (CD) drive(s), and/or one or more digital versatile disc (DVD) drive(s) for example.

The NVM/storage 816 may include a storage resource physically part of a device on which the system 800 is installed or it may be accessible by, but not necessarily a part of, the device. For example, the NVM/storage 816 may be accessed over a network via the communications interface(s) 820.

System memory 812 and NVM/storage 816 may include, in particular, temporal and persistent copies, respectively, of logic 824.

In various embodiments, the system 800 may be a part of the UE 20a, and the logic 824 may include instructions that when executed by at least one of the processor(s) 804 result in the system 800 generating the interference feedback information 210a and/or the channel feedback information 220a, and transmitting these information to the eNB 10b and/or 10a, e.g., as discussed with respect to the method 600 of FIG. 6.

In various other embodiments, the system 800 may be a part of the eNB 10b, and the logic 824 may include instructions that when executed by at least one of the processor(s) 804 result in the system 800 receiving the interference feedback information 210a and the channel feedback information 220b, determining the precoding matrix PM_b, determining the truncated precoding matrix PM_b_t, and/or transmitting signals to UE 20b subsequent to weighting the signals by the truncated precoding matrix PM_b_t, e.g., as discussed with respect to the method 700 of FIG. 7.

Communications interface(s) 820 may provide an interface for system 800 to communicate over one or more network(s) and/or with any other suitable device. Communications interface(s) 820 may include any suitable hardware and/or firmware. Communications interface(s) 820 for one embodiment may include, for example, a network adapter, a wireless network adapter, a telephone modem, and/or a wireless modem. For wireless communications, communications interface(s) 820 for one embodiment may use one or more antennae.

For one embodiment, at least one of the processor(s) 804 may be packaged together with logic for one or more controller(s) of system control logic 808. For one embodiment, at least one of the processor(s) 804 may be packaged together with logic for one or more controllers of system control logic 808 to form a System in Package (SiP). For one embodiment, at least one of the processor(s) 804 may be integrated on the same die with logic for one or more controller(s) of system control logic 808. For one embodiment, at least one of the processor(s) 804 may be integrated on the same die with logic for one or more controller(s) of system control logic 808 to form a System on Chip (SoC).

In various embodiments, system 800 may have more or less components, and/or different architectures.

Although certain example methods, apparatus, and articles of manufacture have been described herein, the scope of coverage of the present disclosure is not limited thereto. On the contrary, the present disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
   wirelessly receiving, by a user equipment (UE), interference signal from a first enhanced Node B (eNB) while the UE is communicating with a second eNB over a wireless communication channel;
   generating, by the UE, interference feedback information that is associated with an interference channel between the first eNB and the UE, based at least in part on receiving the interference signal from the first eNB;
   generating, by the UE, channel feedback information associated with a channel between the UE and the second eNB;
   transmitting, by the UE, the interference feedback information to the first eNB via the second eNB; and
   transmitting, by the UE, the channel feedback information to the second eNB to facilitate a determination, by the second eNB, of a modulation and coding scheme, a rank or a precoding matrix associated with signal transmission by the second eNB to the UE.

2. The method of claim 1, wherein said generating the interference feedback information further comprises:
   generating the interference feedback information to facilitate a determination of a precoding matrix, by the first eNB, that reduces the interference signal.

3. The method of claim 1, wherein said generating the interference feedback information further comprises:
   generating, by the UE, a preferred interference rank indicator that indicates a recommended number of data streams to be transmitted by the first eNB.

4. The method of claim 1, wherein said generating the channel feedback information further comprises:
   estimating a channel feedback matrix that includes one or more eigenvectors of the wireless communication channel between the UE and the second eNB; and
   determining a channel feedback matrix index associated with the channel feedback matrix, wherein the channel feedback information comprises the channel feedback matrix index.

5. The method of claim 4, wherein the interference feedback information comprises a preferable rank to be used by the second eNB for signal transmission or a channel quality indicator (CQI) that is determined without taking into account the generation of the interference feedback information.

6. The method of claim 1, wherein transmitting the channel feedback information and said transmitting the interference feedback information further comprises:
   transmitting the interference feedback information and the channel feedback information such that the interference feedback information is interleaved with the channel feedback information.

7. The method of claim 1, wherein the UE wirelessly communicates with the second eNB in accordance with an advanced long-term evolution (LTE) protocol.

8. A method comprising:
   wirelessly receiving, by a user equipment (UE), interference signal from a first enhanced Node B (eNB) while the UE is communicating with a second eNB over a wireless communication channel;
   generating, by the UE, interference feedback information that is associated with an interference channel between the first eNB and the UE, based at least in part on receiving the interference signal from the first eNB, wherein said generating the interference feedback information further comprises:
      estimating an interference feedback matrix that includes one or more eigenvectors of an interference matrix associated with the interference channel, based at least in part on receiving the interference signal; and
      determining an interference feedback matrix index associated with the interference feedback matrix, wherein the interference feedback information comprises the interference feedback matrix index; and
   transmitting, by the UE, the channel feedback information to the second eNB to facilitate a determination, by the second eNB, of a modulation and coding scheme, a rank or a precoding matrix associated with signal transmission by the second eNB to the UE.

9. The method of claim 8, further comprising:
   estimating, by the UE, a signal to interference plus noise ratio (SINR) without taking into account the interference signal from the first eNB.

10. The method of claim 8, further comprising:
    determining, by the UE, an orthogonal matrix, wherein the orthogonal matrix includes a vector that is orthogonal to another vector of the interference feedback matrix; and
    estimating, by the UE, a signal to interference plus noise ratio (SINR) based at least in part on the orthogonal matrix.

11. The method of claim 10, further comprising:
    estimating, by the UE, a channel quality indicator (CQI) based at least in part on the SINR; and
    transmitting, by the UE, the CQI to the first eNB as a part of the interference feedback information, to facilitate determination of a precoding matrix, by the first eNB, that reduces the interference signal.

12. The method of claim 11, further comprising:
    transmitting, by the UE, the CQI to the second eNB, to facilitate determination, by the second eNB, of a modulation and coding scheme, a transmission rank, or a precoding matrix associated with signal transmission by the second eNB.

13. An enhanced Node B (eNB) comprising:
    a receiver circuitry configured to receive, from a user equipment (UE) through another eNB, an interference feedback matrix index associated with an interference channel between the eNB and the UE; and
    a precoding circuitry configured to determine a precoding matrix based at least in part on the interference feedback matrix index;
    wherein the precoding matrix comprises a first set of precoding vectors and a second set of precoding vectors, wherein the second set of precoding vectors are associated with signal transmission between the eNB and the UE; and
wherein the precoding matrix circuitry is further configured to determine a truncated precoding matrix by excluding the second set of precoding vectors from the precoding matrix.

14. The eNB of claim 13, further comprising:
a transmission circuitry configured to transmit signals to one or more other UEs based at least in part on the truncated precoding matrix.

15. The eNB of claim 13,
wherein the receiver circuitry is further configured to receive, from another UE, a channel feedback matrix index associated with a wireless communication channel between the eNB and the another UE; and
wherein the precoding matrix circuitry is further configured to determine the precoding matrix based at least in part on the channel feedback matrix index.

16. The eNB of claim 13,
wherein the receiver circuitry is further configured to receive, from the UE via the another eNB, a channel quality indicator (CQI); and
wherein the precoding matrix circuitry is further configured to determine the precoding matrix based at least in part on the CQI.

17. The eNB of claim 13,
wherein the receiver circuitry is further configured to receive, from the UE via the another eNB, a preferred interference rank indicator; and
wherein the eNB is configured to determine a number of data streams to be transmitted by the eNB based at least in part on the preferred interference rank indicator.

18. The eNB of claim 13, wherein the receiver circuitry is further configured to receive the interference feedback matrix index from the another eNB over a backhaul channel.

19. An user equipment (UE) comprising:
a receiver circuitry configured to wirelessly receive interfering signals from a first enhanced Node B (eNB) while the UE is communicating with a second eNB over a wireless communication channel;
a channel estimation circuitry configured to:
estimate an interference matrix that is associated with an interference channel between the first eNB and the UE; and
estimate a channel matrix that is associated with the wireless communication channel between the UE and the second eNB;
a feedback determination circuitry configured to:
generate interference feedback information based at least in part on the interference matrix; and
generate channel feedback information based at least in part on the channel matrix; and
a transmitter circuitry configured to:
transmit the interference feedback information to the first eNB via the second eNB; and
transmit the channel feedback information to the second eNB.

20. The UE of claim 19, wherein the interference matrix includes one or more eigenvectors, and wherein the generation of the interference feedback information includes generating an interference feedback matrix that includes one or more of the eigenvectors of the interference matrix, and wherein the interference feedback information includes an interference feedback matrix index associated with the interference feedback matrix.

* * * * *

UNITED STATES PATENT AND TRADEMARK OFFICE
CERTIFICATE OF CORRECTION

| | | |
|---|---|---|
| PATENT NO. | : 8,687,727 B2 | Page 1 of 1 |
| APPLICATION NO. | : 13/075023 | |
| DATED | : April 1, 2014 | |
| INVENTOR(S) | : Alexei Davydov et al. | |

It is certified that error appears in the above-identified patent and that said Letters Patent is hereby corrected as shown below:

In the Claims

Col. 14, line 63 (Claim 13, line 6): Please replace "a precoding circuitry" with --a precoding matrix circuitry--.

Signed and Sealed this
Twenty-first Day of April, 2015

Michelle K. Lee
*Director of the United States Patent and Trademark Office*